United States Patent
Kurabayashi et al.

[11] Patent Number: 5,614,007
[45] Date of Patent: Mar. 25, 1997

[54] INK SET, AND METHOD AND APPARATUS FOR IMAGE FORMATION EMPLOYING THE SAME

[75] Inventors: Yutaka Kurabayashi, Tokorozawa; Katsuhiro Shirota, Inagi; Katsuhiko Takahashi, Yokohama, all of Japan

[73] Assignee: Canon Kabushiki Kaisha, Tokyo, Japan

[21] Appl. No.: 411,156

[22] Filed: Mar. 27, 1995

[30] Foreign Application Priority Data

Mar. 29, 1994 [JP] Japan .................................. 6-059073

[51] Int. Cl.⁶ ...................................... C09D 11/02
[52] U.S. Cl. ........................ 106/22 R; 106/20 D
[58] Field of Search .................. 106/22 R, 20 D

[56] References Cited

U.S. PATENT DOCUMENTS

| | | | |
|---|---|---|---|
| 4,425,162 | 1/1984 | Sugiyama et al. | 106/20 D |
| 4,538,160 | 8/1985 | Uchiyama | 346/140 R |
| 4,599,627 | 7/1986 | Vollert | 346/140 R |
| 4,864,324 | 9/1989 | Shirota et al. | 346/1.1 |
| 5,017,227 | 5/1991 | Koike et al. | 106/22 C |
| 5,074,914 | 12/1991 | Shirota et al. | 106/22 |
| 5,110,356 | 5/1992 | Shirota et al. | 106/22 |
| 5,118,351 | 6/1992 | Shirota et al. | 106/22 |
| 5,123,960 | 6/1992 | Shirota et al. | 106/22 |
| 5,135,570 | 8/1992 | Eida et al. | 106/22 |
| 5,135,571 | 8/1992 | Shirota et al. | 106/22 |
| 5,139,573 | 8/1992 | Yamamoto et al. | 106/22 |
| 5,141,558 | 8/1992 | Shirota et al. | 106/22 |
| 5,151,128 | 9/1992 | Fukushima et al. | 106/20 |
| 5,190,581 | 3/1993 | Fukushima et al. | 106/20 D |
| 5,216,437 | 6/1993 | Yamamoto et al. | 346/1.1 |
| 5,220,347 | 6/1993 | Fukushima et al. | 346/1.1 |
| 5,221,333 | 6/1993 | Shirota et al. | 106/20 D |
| 5,231,417 | 7/1993 | Shirota et al. | 346/1.1 |
| 5,248,991 | 9/1993 | Shirota et al. | 346/1.1 |
| 5,250,121 | 10/1993 | Yamamoto et al. | 106/22 R |
| 5,254,157 | 10/1993 | Koike et al. | 106/20 D |
| 5,258,066 | 11/1993 | Kobayashi et al. | 106/22 R |
| 5,296,022 | 3/1994 | Kobanyashi et al. | 106/20 D |
| 5,329,305 | 7/1994 | Fukushima et al. | 347/95 |
| 5,358,558 | 10/1994 | Yamamoto et al. | 106/22 R |

FOREIGN PATENT DOCUMENTS

| | | |
|---|---|---|
| 0224909A3 | 6/1987 | European Pat. Off. . |
| 55-66976 | 5/1980 | Japan . |
| 55-65269 | 5/1980 | Japan . |
| 61-59914 | 12/1986 | Japan . |
| 61-59912 | 12/1986 | Japan . |
| 61-59911 | 12/1986 | Japan . |
| 63-299971 | 12/1988 | Japan . |
| 64-9279 | 1/1989 | Japan . |
| 64-63185 | 3/1989 | Japan . |

OTHER PUBLICATIONS

Derwent Publications (Database WPI) AN 81–70635, Week 8139 with respect to JP A–56 099 693 Aug. 11, 1980.
Derwent Publications (Database WPI) AN 86–242869, Week 8637 with respect to JP A–61 172 787 Aug. 4, 1986.

*Primary Examiner*—Helene Klemanski
*Attorney, Agent, or Firm*—Fitzpatrick, Cella, Harper & Scinto

[57] ABSTRACT

Provided is an ink set comprising a liquid composition containing a cationic substance, and a black ink in combination, the black ink containing a black dye, and a cyan dye and/or a yellow dye as water-soluble anionic dyes.

33 Claims, 3 Drawing Sheets

INK SET, AND METHOD AND APPARATUS FOR IMAGE FORMATION EMPLOYING THE SAME

BACKGROUND OF THE INVENTION

1. Field of the Invention

The present invention relates to an ink set, particularly to an ink set suitable for an ink-jet system. The present invention also relates to an image-forming method employing the ink set. The present invention further relates to an ink-jet apparatus employing the ink set.

2. Related Background Art

Ink-jet recording is a recording method which conducts recording by ejecting ink droplets onto a recording medium such as a paper sheet. In particular, the ink-jet recording method disclosed in JP-B-61-59911, JP-B-61-59912, and JP-B-61-59914 ("JP-B" herein means examined Japanese patent publication) employs an electro-thermal transducer which supplies energy to the ink to form bubbles in the ink to eject ink droplets. This method enables construction of a multiple orifice recording head having orifices arranged at a high density, thereby giving high-quality images with high resolution at a high recording speed.

In conventional ink-jet recording, the ink contains water as the main component, and additionally a water-soluble high-boiling solvent as a minor component for prevention of drying of the ink and clogging of orifices. In recording on plain paper with such an ink, fixation of the ink is likely to be insufficient and the formed image tends to be irregular, probably due to non-uniform distribution of the filler or the sizing agent in the recording paper. In particular, in color image recording, a plurality of color ink droplets are successively projected in superposition before the respective inks are sufficiently fixed on the paper sheet, thereby causing running of the ink or irregular mixing of the colors at the color border portions (this phenomenon is called "bleeding") and as a result, satisfactory images cannot be obtained.

For improvement of ink fixation, JP-A-55-65269 ("JP-A" herein means unexamined Japanese patent laid-open application) discloses addition of a compound for enhancing penetration such as a surfactant to the ink, and JP-A-55-66976 discloses an ink mainly composed of a volatile solvent. The former method improves the ink fixability and decreases the bleeding of the ink to a certain degree due to the promotion of penetration of the ink into the recording paper sheet, but involves disadvantages such that the coloring matter penetrates excessively deep together with the ink into the recording paper sheet to result in low density and low saturation of the image, and the ink runs laterally to result in less sharpness of the edge of the image and less resolution. On the other hand, the latter method tends to cause clogging of the orifices of the recording head by evaporation of the solvent, in addition to the aforementioned disadvantages of the former method.

For solving the above problems, methods are disclosed in which a liquid for ameliorating the image quality is applied onto the recording medium prior to the application of a recording ink. For example, JP-A-63-299971 discloses a recording method in which a liquid containing an organic compound having two or more cationic groups in the molecule is applied onto the recording medium and thereafter recording is conducted with an ink containing an anionic dye. JP-A-64-9279 discloses a recording method in which an acidic liquid containing succinic acid or the like is applied on the recording medium and then recording is conducted with an ink containing an anionic dye. JP-A-64-63185 discloses a recording method in which a liquid capable of insolubilizing the dye is applied before recording with the ink.

The above methods intend to deposit the dye itself for prevention of bleeding and for improvement of the water resistance of the image. However, the insolubilization of the dye remarkably depresses its coloring property due to agglomeration of the dye.

In particular, a black ink containing a water-soluble black dye, when used for such an image formation, causes agglomeration of the dye, which noticeably decreases the coloring ability and tinges the black portion of the image with red, which is known as the bronzing phenomenon, to impair the quality of the recorded image.

SUMMARY OF THE INVENTION

The present invention intends to solve four technical problems mentioned below, in view of the actual state of the prior art. Namely, the main object of the present invention is, in ink-jet recording on a so-called plain paper sheet as a recording medium, to achieve:

(1) excellent image quality with sufficient fixability;

(2) sufficient image density, and solid print images high in uniformity;

(3) excellent black printing without causing the bronzing phenomenon; and (4) sufficient water resistance of the recorded image.

The above objects can be achieved by the present invention described below.

The present invention provides an ink set comprising a liquid composition containing a cationic substance, and a black ink in combination, the black ink containing s black dye, and a cyan dye and/or a yellow dye as water soluble anionic dyes. The ink set may combine any of a yellow ink, a magenta ink and a cyan ink.

The present invention also provides an image forming method which employs a liquid composition containing a cationic substance, and a black ink in combination for forming a black color portion, the black ink comprising a black dye, and a cyan dye and/or a yellow dye as water soluble anionic dyes.

The present invention further provides a method for mitigating the bronzing phenomenon in an image formation method which employs a liquid composition containing a cationic substance, and a black ink in combination for forming a black color portion, the black ink containing a black dye, and a cyan dye and/or a yellow dye as water soluble anionic dyes.

The present invention further provides an image-forming method for forming a black image portion by applying a liquid composition and a black ink on a recording medium by an ink-jet system with the above ink set.

The present invention still further provides a recording unit having containers for a liquid composition and a black ink, and a head for ejecting the liquid composition and the black ink as droplets by employing the above ink set.

The present invention still further provides an ink cartridge having containers for a liquid composition and a black ink, employing the above ink set.

The present invention still further provides an ink-jet apparatus having the above recording unit.

The present invention still further provides an image having a black portion formed by the use of a liquid composition containing a cationic substance, and a black ink in combination, the black ink containing a black dye, and a cyan dye and/or a yellow dye as water-soluble anionic dyes.

DETAILED DESCRIPTION OF THE PREFERRED EMBODIMENTS

Figure 1:
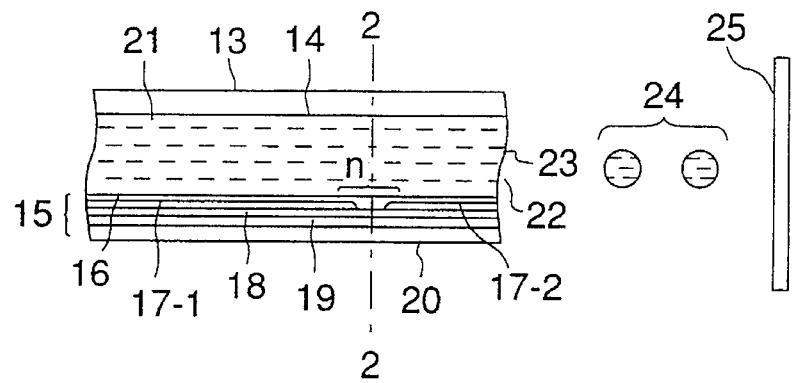
FIG. 1 is a longitudinal sectional view along the ink flow path of a recording head of an ink-jet recording apparatus.

In the present invention, the aforementioned liquid composition and the ink are allowed to be mixed on the surface of, or in the interior of, the recording paper sheet to bond electrostatically a cationic substance in the liquid composition with an anionic radical of a dye in the ink to cause instantaneous agglomeration of the dye. The dye component in the ink thus is separated from the solvent (hereinafter this phenomenon is called "solid-liquid separation"), and only the solvent component penetrates into the interior of the recording paper sheet so that the dye component as the coloring material does not cause bleeding.

The solid-liquid separation will occur more effectively when a liquid composition contains a first cationic substance of a molecular weight of not higher than 1,000 and a second cationic compound of a molecular weight of not lower than 1,500. The molecular weight herein means a number-average molecular weight measured by GPC (gel permeation chromatography) by use of polyethylene oxide as the standard substance.

The detailed mechanism is not clear for the more effective solid-liquid separation in the presence of the two cationic substances of different molecular weights. The mechanism, however, may be assumed to be as follows. In the first reaction stage, the lower-molecular weight cationic substance contained in the liquid composition associates with the water-soluble dye having an anionic group in the ink by ionic interaction to separate the dye instantaneously from the solution phase. In the second reaction stage, the association product of the dye with the lower-molecular cationic substance is adsorbed by the higher-molecular one of the cationic substances in the liquid composition to increase the size of the dye agglomerate formed by the association. Therefore, the dye does not readily penetrate into the fiber space, and after the solid liquid separation only the liquid component penetrates into the interior of the recording paper sheet. Thereby both the high quality and rapid fixation of the printed image can be achieved.

The agglomerate formed from the lower-molecular cationic substance, the anionic dye, and the higher-molecular cationic substance has a high viscosity, and is not carried by migration of the liquid medium. Therefore, a high quality printed image is obtainable at a higher fixation rate without impairing the sharpness of the edge of the letter or image, as compared with the prior art. Since the aforementioned agglomerate is inherently water-insoluble, the resulting image has an excellent water resistance.

It is supposed that the above agglomerate may crystallize on a recording paper sheet. In particular, a black ink may exhibit no black color due to a reddish hue, depending on the kind and concentration of the dye, amount of the ejected ink, and the kind of the paper (bronzing phenomenon). This bronzing phenomenon has been found to be prevented by adding, to the black dye, a cyan color dye and/or a yellow color dye to give a satisfactory black color. The present invention has been accomplished based on the above findings.

The present invention is described in more detail by reference to preferred embodiments.

The liquid composition is explained firstly. The essential component of the liquid composition is a cationic substance. The cationic substance in the present invention serves to form an agglomerate by electrostatic bonding with the water-soluble anionic dye described later and contained in the ink. More preferably, the cationic substance is composed of two components below:

(1) A lower-molecular cationic substance having a molecular weight of not higher than 1,000, and (2) A higher-molecular cationic substance having a molecular weight of not lower than 1,500, but not higher than 10,000.

The essential component of the ink of the present invention is:

(3) A water-soluble anionic dye having one or more anionic groups in the molecule, the anionic dye being composed of mainly a black dye and additionally a cyan dye or a yellow dye, or a combination thereof.

Specific examples of the lower molecular cationic substance (1) having a molecular weight of not higher than 1,000 include: salts of primary, secondary, and tertiary amines such as hydrochloride salt, acetate or the like of laurylamine, coconut-amine, stearylamine, and rosin-amine; quaternary ammonium salts such as lauryltrimethylammonium chloride, lauryldimethylbenzylammonium chloride, benzyltributylammonium chloride, and benzalkonium chloride; pyridinium salts such as cetylpyridinium chloride, and cetylpyridinium bromide; imidazoline type cationic compounds such as 2-heptadecenyl-hydroxyethylimidazoline; ethylene oxide adducts of higher alkylamine such as dihydroxyethylstearylamine, and the like. Further, the ampholytic surfactants which are cationic in a certain pH range may be used in the present invention: specific examples including ampholytic surfactants of the amino acid type, compounds of R—NH—$CH_2$—$CH_2$—COOH type, compounds of the betaine type such as stearyldimethylbetaine and lauryldihydroxyethyl-betaine, and other carboxylate salt type ampholytic surfactants; and ampholytic surfactants of the sulfate ester type, the sulfonic ester type, and the phosphate ester type. When using the ampholytic surfactant, naturally the liquid composition is adjusted to be at a pH lower than the isoelectric point, or to come to have a pH lower than the isoelectric point when it is mixed with the ink on a recording medium.

The lower-molecular cationic substance is not limited to the above examples in the present invention. A monomer or an oligomer of the higher-molecular cationic substance mentioned later may be used as the lower-molecular cationic substance (1).

Of the above lower-molecular cationic substances of molecular weight of not higher than 1,000, those having a molecular weight in the range of from 100 to 700 are particularly preferred because of their surfactant activity, their high reaction rate with the dye, and the sharpness of the edge of the recorded image.

The cationic higher-molecular substance (2) having a molecular weight ranging from 1,500 to 10,000 serves, as mentioned above, to adsorb the associate of the dye and the low-molecular cationic component in the molecule thereof to increase the size of the dye agglomerate having been formed by the association and to retard the penetration of the agglomerate into the fiber interspace in the recording paper sheet, thereby achieving both a high quality of the recorded images and high fixability of the dye. The cationic polymeric substances include polyallylamine hydrochloride, polyamine sulfonate hydrochloride, polyvinylamine hydrochloride, and chitosan acetate, but are not limited thereto. The salt type thereof is not limited to hydrochloride salt and acetate types.

Other examples of the higher-molecular cationic substance are compounds prepared by partially cationizing a nonionic polymeric substance. Specific examples include copolymers of vinylpyrrolidone with a quaternary salt of aminoalkylacrylate, and a copolymer of acrylamide with quaternary salt of aminomethylacrylamide, and the like, but are not limited thereto.

The aforementioned partially cationized polymeric substances and the cationic polymeric substances are preferably water-soluble, but may be in a state of a dispersion like a latex or an emulsion.

The higher-molecular cationic substance in the present invention has a molecular weight in the range of preferably from 1,500 to 10,000, more preferably from 1,500 to 7,000, to avoid deterioration of the coloring properties of the dye. In application of the liquid composition onto a recording medium with an ink-jet recording head, there is also an advantageous feature the ejection characteristics of the composition are good, since the solution viscosity can be kept low even if a content of compound is increased as the compound has a molecular weight as it is shifted to a lower molecular weight region.

The above-mentioned molecular weight is measured by GPC (gel permeation chromatography) or a like method in terms of a polyethylene oxide standard.

The aforementioned components in the liquid composition are contained at a concentration of from 0.005 to 20% by weight. A suitable range depends on the combination of the employed substances.

Components other than the above components constituting the liquid composition are shown specifically below. The liquid composition contains, in addition to the components (1) and (2), usually water, a water-soluble organic solvent, and other additives.

The water-soluble organic solvent includes amides such as dimethylformamide, and dimethylacetamide; ketones such as acetone; ethers such as tetrahydrofuran, and dioxane; polyalkylene glycols such as polyethylene glycol, and polypropylene glycol; alkylene glycols such as ethylene glycol, propylene glycol, butylene glycol, triethylene glycol, hexylene glycol, and diethylene glycol; 1,2,6-hexanetriol; thiodiglycol; lower alkyl ethers of polyhydric alcohols such as ethylene glycol methyl ether, diethylene glycol monomethyl ether, and triethylene glycol monomethyl ether; monohydric alcohols such as ethanol, isopropyl alcohol, n-butyl alcohol, and isobutyl alcohol; glycerin, N-methyl-2-pyrrolidone, 1,3-dimethylimidazolidinone, triethanolamine, sulfolane, dimethylsulfoxide, and the like. The water-soluble organic solvent is contained preferably in the range of from 1 to 60% by weight, more preferably from 5 to 30% by weight, but is not limited thereto. The liquid composition may further contain other additives such as a viscosity controlling agent, a pH controlling agent, an antiseptic agent, a surfactant, an antioxidant, evaporation promoting agent, and the like. The surfactant should be carefully selected since it is particularly important in adjusting the penetration properties of the liquid.

The liquid composition useful in the present invention is required not to change the color tone of the recording ink. The preferred physical properties of the liquid composition at 25° C. are a pH of from 3 to 12, a surface tension of from 10 to 60 dyn/cm, and a viscosity of from 1 to 30 cP.

The recording ink employed in the present invention is described below.

The recording ink in the present invention comprises the aforementioned water-soluble anionic dye having one or more anionic groups, water, a water-soluble organic solvent, and other components such as a viscosity-controlling agent, a pH-adjusting agent, an antiseptic agent, a surfactant, and an antioxidant.

The water-soluble anionic dye having one or more anionic groups employed in the present invention may be any of the water-soluble acid dyes, direct dyes, and reactive dyes described in the Color Index without special limitation. Further, any dyes which have one or more anionic groups, such as a sulfonic group and a carboxylic group, may be used without limitation irrespectively of the Color Index. The water-soluble anionic dyes naturally include those which have a pH-dependent solubility.

The water-soluble black dye having one or more anionic groups employed in the present invention may be any of water-soluble acid dyes, direct dyes, and reactive dyes listed in the Color Index. Specific examples of the dyes are enumerated below without limiting the dye thereto: C.I. Direct Black 17, 19, 22, 32, 51, 62, 108, 112, 113, 117, 118, 122, 132, 146, 154, 159, 162, 168, 169, and 173; C.I. Acid Black 1, 3, 7, 24, 26, 31, 48, 50, 58, 60, 61, 63, 107, 109, 112, 119, 131, 132, 140, 155, 164, 170, 172, 187, 188, 192, 194, 207, and 222; C.I. Food Black 1, and 2, and the like.

Any black dye having one or more anionic groups such as a sulfonic group and a carboxylic group may be used irrespectively of the Color Index. The water-soluble dyes herein naturally include those having pH-dependent solubility.

The cyan dye to be mixed with the aforementioned black dye may be any water-soluble cyan dye having one or more anionic groups. Specific examples thereof include: C.I. Acid Blue 1, 7, 9, 23, 103, 132, 142, 230, 239, 258, and 280; C.I. Direct Blue 78, 86, 189, 199, 225, and 273; C.I. Reactive Blue 2, 10 14, 18, 21, 25, 38, 41, 63, 72, 140, 207, 227, and 231; and the like, but are not limited thereto. Any cyan dye having one or more anionic groups such as a sulfonic group and a carboxylic group may be used irrespectively of the Color Index without any problem, similarly as the black dye.

The yellow dye to be mixed with the aforementioned black dye may be any water-soluble yellow dye having one or more anionic groups. Specific examples thereof include: C.I. Direct Yellow 86, 142, and 144; C.I. Acid Yellow 11, 17, 23, 25, 38, 44, 49, 61, 72, 110, 127, 158, and 176; and the like. Any yellow dye having one or more anionic groups such as a sulfonic group and a carboxylic group may be used irrespectively of the Color Index without any problem, similar to the black dye.

The mixing ratio of the black dye to the cyan or yellow dye is preferably in the range of from 100:5 to 100:50 by weight, more preferably from 100:5 to 100:40 by weight. In particular, the black ink preferably contains the cyan dye and/or yellow dye at a content of 0.1 to 50% by weight, more preferably 0.5 to 40% by weight, based on the total weight of the black dye.

Whether the dye to be mixed with the black dye is to be selected solely from a cyan dye or a yellow dye, or alternatively a combination thereof, depends on the components in the liquid composition, and the kinds of the dyes.

In order to obtain a black hue when the liquid composition and the black ink comprising a mixture of the water-soluble anionic dyes, the following color-matching procedures may be exemplified. First, solid printing is conducted with the liquid composition and an ink containing the black dye only. The chromaticity (CIE L*a*b*) of the formed solid print is measured, and its deviation from the intended chromaticity value is checked. Thereby the color component to be mixed with the black dye is decided. After adjustment of the formulation, the solid printing is repeated to obtain the most suitable formulation. However, such procedure is not always necessary.

The content of the dyes in the ink of the present invention is generally in the range of from 0.1 to 15% by weight, preferably from 0.5 to 10% by weight, more preferably from 0.5 to 6% by weight, but is not limited thereto. The cyan dye or the yellow dye may be used singly, or the two dyes may be used in combination.

The liquid medium suitable for the ink of the present invention is water or a mixed solvent composed of water and a water-soluble organic solvent. The water is preferably deionized water, not ordinary tap water containing various ions. The water-soluble organic solvent includes alkanols having 1 to 5 carbon atoms such as methyl alcohol, ethyl alcohol, n-propyl alcohol, isopropyl alcohol, n-butyl alcohol, sec-butyl alcohol, tert-butyl alcohol, isobutyl alcohol, and n-pentyl alcohol; amides such as dimethylformamide, and dimethylacetamide; ketones and ketoalcohols such as acetone, and diacetone alcohol; ethers such as dioxane; polyalkylene glycols such as polyethylene glycol, and polypropylene glycol; alkylene glycols whose alkylene moiety has 2 to 6 carbon atoms such as ethylene glycol, propylene glycol, butylene glycol, triethylene glycol, hexylene glycol, and diethylene glycol; 1,2,6-hexanetriol; thiodiglycol; glycerin; lower alkyl ethers of polyhydric alcohols such as ethylene glycol monomethyl ether, ethylene glycol monoethyl ether, diethylene glycol monomethyl ether, diethylene glycol monoethyl ether, triethylene glycol monomethyl ether, and triethylene glycol monoethyl ether; lower dialkyl ethers of polyhydric alcohols such as triethylene glycol dimethyl ether, triethylene glycol diethyl ether; tetraethylene glycol dimethyl ether, and tetraethylene glycol diethyl ether; sulfolane, N-methyl-2-pyrrolidone, 1,3-dimethyl-2-imidazolidinone, and the like.

The solvent for the ink of the present invention is selected from the above organic solvents. Diethylene glycol or thiodiglycol is preferred, in particular, for prevention of the clogging of orifices by the ink in the present invention. In view of the frequency response, a lower alcohol or a surfactant is preferably used. Accordingly, the solvent in the ink of the present invention comprises water and the aforementioned components.

The water-soluble organic solvent is contained in the ink at a content of from 2 to 80% by weight, preferably from 3 to 70% by weight, more preferably from 4 to 60% by weight based on the entire ink.

Water is contained in the ink at a content generally from 10 to 97.5% by weight, preferably from 35 to 97.5% by weight, more preferably from 45 to 97.5% by weight based on the entire ink. When the water content of the ink is less than 10% by weight, a large amount of low volatile organic solvent remains in the recorded image, which tends to cause migration of the dye, bleeding of the image, or similar problems.

The ink of the present invention may contain further additives such as a pH-adjusting agent, a viscosity-adjusting agent, a surface tension-controlling agent, and the like, if necessary. The pH-controlling agent includes organic amines such as diethanolamine, and triethanolamine; and inorganic alkaline agent containing an alkali metal hydroxide such as sodium hydroxide, lithium hydroxide, and potassium hydroxide.

The ink of the present invention has, at 25° C., a viscosity ranging from 1 to 20 cP, preferably from 1 to 15 cP, a surface tension of not lower than 15 dyn/cm, preferably 25 dyn/cm, and a pH value ranging from about 6 to about 10.

The ink of the present invention may further contain an anionic surfactant or an anionic polymeric substance, or the aforementioned ampholytic surfactant having an adjusted pH higher than the isoelectric point. The usual anionic surfactant such as a carboxylate salt type, a sulfate ester type, a sulfonate salt type, and phosphate ester type may be used without any problem. The anionic polymeric substance includes alkali-soluble resin such as sodium polyacrylate, and polymers having an acrylic acid unit copolymerized partially, but is not limited thereto.

The recording medium for practicing the present invention is not specially limited, and may be plain paper such as copying paper, and bond paper, or may be coated paper specially designed for ink-jet recording, light-transmissive OHP films, wood-free paper, or glossy paper.

In a preferred embodiment of the image forming method of the present invention, the aforementioned liquid composition is applied preliminarily onto the image-forming area and, if necessary, the peripheral area thereof on the recording medium, and subsequently ink is allowed to be deposited thereon. The image-forming area herein means the area where ink dots are deposited, and the peripheral area herein means the area of an width of 1 to 5 dots adjoining and surrounding the image-forming area.

The liquid composition may be applied onto the entire face of the recording medium with a sprayer or a roller. However, an ink-jet method is preferred which enables the uniform and selective application of the liquid composition on the image-forming area and the periphery thereof. The time interval between the liquid composition application and the ink application is not specially limited.

Ink-jet processes are preferred for the application of the liquid composition and application of the ink on a recording medium as described above. Of the processes, the process is particularly preferred in which ink droplets are ejected by means of bubbles generated by thermal energy.

Figure 2:
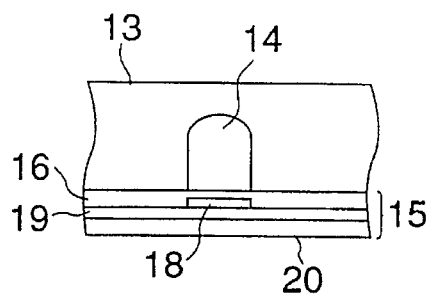
FIG. 2 is a cross-sectional view perpendicular to the ink flow path of a recording head of an ink-jet recording apparatus.
Figure 3:
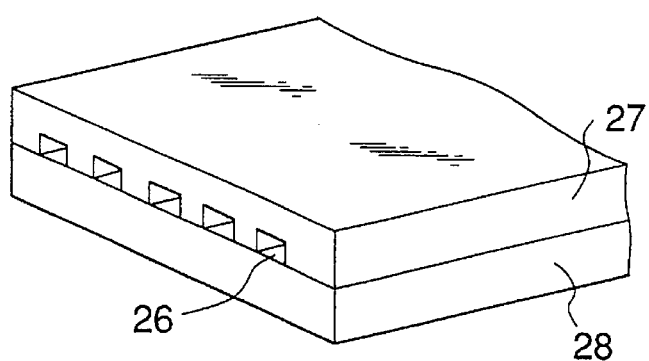
FIG. 3 is a perspective external view of a recording head of an ink-jet recording apparatus.

An example of the ink-jet recording apparatus which is suitable for recording with the ink set of the present invention is explained by reference to the drawings. FIGS. 1, 2, and 3 illustrate an example of the construction of a head which is the essential part of the apparatus.

FIG. 1 is a sectional view of the head 13 along the ink flow path, and FIG. 2 is a sectional view taken at the line 2—2 in FIG. 1.

In these drawings, a head 13 is constructed by bonding a plate of glass, ceramics, plastics, or the like having grooves 14 for ink flow with a heat-generating head 15 for thermal recording. (The heat-generating head is not limited to the one shown in the drawings.) The heat-generating head 15 is constituted of a protection layer 16 formed from silicon oxide or the like; aluminum electrodes 17-1, 17-2; a heat-generating resistance layer 18 made of nichrome or the like; a heat-accumulating layer 19; and a heat-radiating substrate plate 20 made of alumina or the like.

The ink 21 fills an ejection orifice (fine nozzle) 22, and has a meniscus 23 formed by a pressure P.

On application of electric signal information to the electrodes 17-1, 17-2 of the head, the region denoted by a symbol "n" on the heat-generating head 15 generates heat abruptly to form bubbles in the ink 21 on that region, the pressure of the bubble pushes out the meniscus 23 to eject the ink 21 from the orifice 22 in the shape of droplets 24. The ejected ink droplets travel toward a recording medium 25.

FIG. 3 shows a external appearance of a multiple head integrating a plurality of heads shown in FIG. 1. The multiple head is formed by bonding a glass plate 27 having multiple grooves 26 with the heat-generating head 28 like the one shown in FIG. 1.

Figure 4:
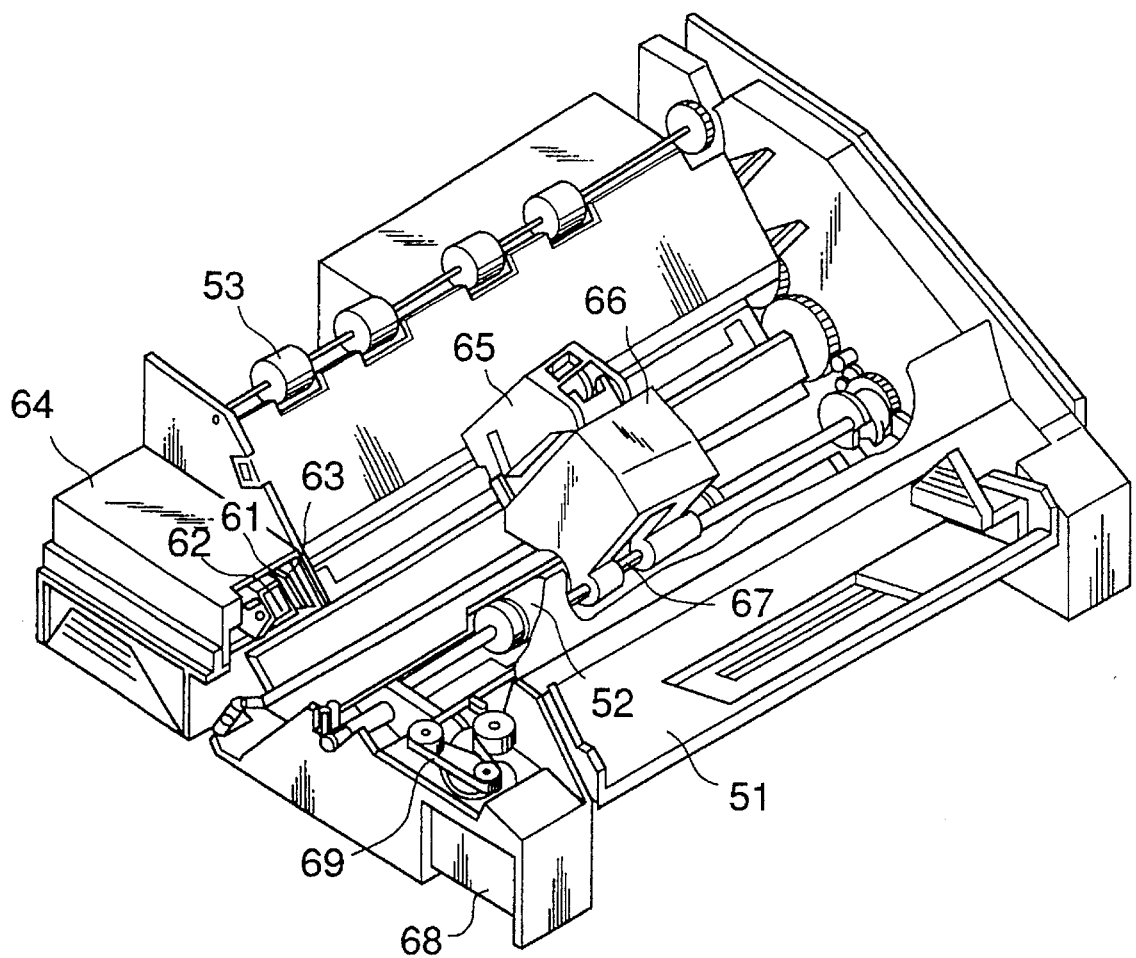
FIG. 4 is a perspective external view of an ink-jet recording apparatus.

FIG. 4 shows an example of an entire ink-jet recording apparatus equipped with the above-described head. In FIG. 4, a blade 61 as a wiping member is held at one end of the blade by a blade-holding member, forming a fixed end in a shape of the cantilever. The blade 61 is placed at a position adjacent to the recording region of the recording head, and, in this example, is held so as to protrude into the moving path of the recording head. The cap 62 is placed at a home position adjacent to the blade 61, and is constituted such that it moves in the direction perpendicular to the moving direction of the recording head to come into contact with the ejection nozzle face to cap the nozzle. An ink absorbent 63 is placed at a position adjacent to the blade 61, and is held so as to protrude into the moving path of the recording head in a manner similar to that of the blade 61. The blade 61, the cap 62, and the absorbent 63 constitute an ejection recovery device 64. The blade 61, and the absorbent 63 serve to remove water, dust, and the like from the face of the ink ejection nozzle. A recording head 65 has an energy-generating means for the ejection, and conducts recording by ejecting the ink onto a recording medium opposite the ejection nozzle face. A carriage 66 is provided for supporting and moving the recording head 65. The carriage 66 is engaged slidably with a guide rod 67. A portion of the carriage 66 is connected (not shown in the drawing) to a belt 69 driven by a motor 68, so that the carriage 66 is movable along the guide rod 67 to the recording region of the recording head 65 and the adjacent region thereto.

A paper delivery device 51 for delivery of a recording medium and a paper delivery roller 52 driven by a motor (not shown in the drawing) delivers a recording medium to the position opposite the ejection nozzle face of the recording head, and the recording medium is delivered with the progress of the recording to a paper discharge device provided with paper-discharging rollers 53.

In the above constitution, when the recording head 65 returns to the home position on completion of recording, the cap 62 of the ejection-recovery device 64 is positioned out of the moving path of the recording head 65, and the blade 61 is allowed to protrude to the moving path. Thereby, the ejecting nozzle face of the recording head 65 is wiped. To cap the ejection face of the recording head 65, the cap 62 protrudes toward the moving path of the recording head to come into contact with the ejection nozzle face.

When the recording head 65 is made to move from the home position to the record-starting position, the cap 62 and the blade 61 are at the same position as in the above-mentioned wiping step, so that the ejection nozzle face of the recording head 65 is wiped also in this movement.

The recording head is moved to the home position not only at the completion of the recording and at the time of ejection recovery, but is also moved at predetermined intervals during recording from the recording region. The nozzle is wiped by such movement.

Figure 5:
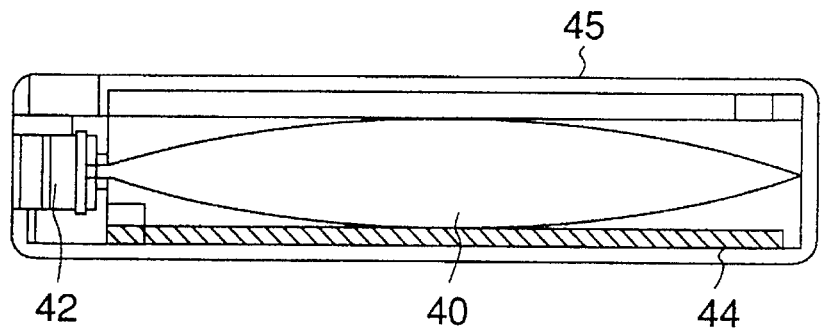
FIG. 5 is a longitudinal sectional view of an ink cartridge.

FIG. 5 is a sectional view of an example of the ink cartridge 45 which holds an ink to be supplied through an ink supplying member such as a tube. The ink container 40, for example an ink bag, contains an ink to be supplied, and has a rubber plug 42 at the tip. Insertion of a needle (not shown in the drawing) into the plug 42 enables supply of the ink from the ink bag 40. A waste-ink absorbent 44 serves to absorb a waste ink. The liquid-contacting face of the ink container is preferably formed from polyolefin, especially polyethylene, in the present invention.

The ink-jet recording apparatus used in the present invention is not limited to the above-mentioned one which has separately a head and an ink cartridge. Integration thereof as shown in FIG. 6 may suitably be employed.

Figure 6:
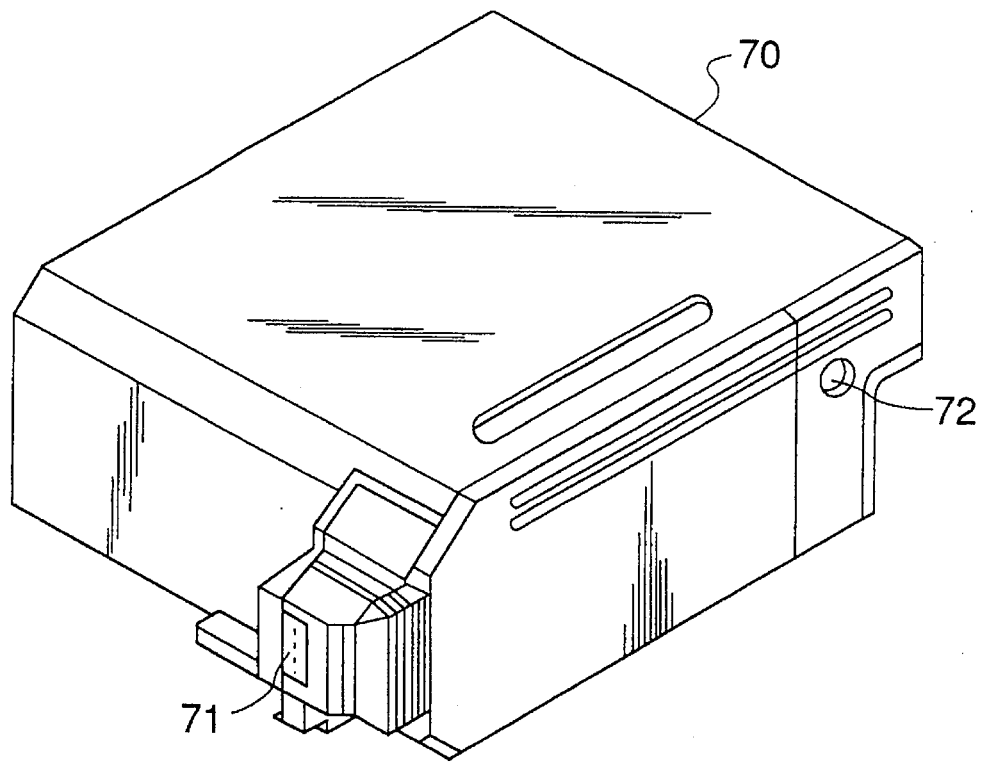
FIG. 6 is a perspective view of a recording unit.

In FIG. 6, a recording unit 70 houses an ink holding member such as an ink absorbent, and the ink in the absorbent is ejected from a plurality of orifices of a head 71. The ink absorbent is made preferably of polyurethane, cellulose, or polyvinyl acetal. An air-communication opening 72 is provided to communicate the interior of the cartridge with the open air. The recording unit 70 may be used in place of the recording head 65 shown in FIG. 4, and is made to be readily mountable to and demountable from the carriage 66.

In the case where the liquid composition is ejected from the ink-jet head, the head for practicing the present invention may be constituted such that the orifices for the liquid composition are juxtaposed perpendicular to the moving direction of the carriage, namely to the scanning direction, or juxtaposed vertically. When the orifices are juxtaposed in the vertical direction, the orifices are divided in two groups of the upper half and the lower half to separate the flow paths of the liquid composition from the flow path of the ink. Naturally, the order of the application of the liquid composition and the recording ink may be reversed.

The present invention is described more specifically by reference to Examples and Comparative Examples.

EXAMPLES 1 to 20

The liquid compositions M-1 to M-4 were prepared by mixing and dissolving the components shown in Table 1 and filtering the resulting solutions under pressure through a membrane filter (trade name: Fluoropore Filter, produced by Sumitomo Electric Industries, Ltd.) having a pore size of 0.22 μm.

Separately, the inks I-1 to I-5 were prepared by mixing the components shown in Table 2 and filtering the resulting solutions under pressure through a membrane filter (trade name: Fluoropore Filter, produced by Sumitomo Electric Industries, Ltd.) having a pore size of 0.22 μm. The viscosities, the surface tensions, and the pH values of the inks are shown in Table 2.

By use of the above liquid compositions and inks, recording was conducted on commercial copying paper sheets with an ink-jet recording apparatus as shown in FIG. 4 in which the orifices for the liquid composition and for the ink were juxtaposed in parallel such that the ink is deposited after the deposition of the liquid composition, under the recording conditions of a recording density of 360 dpi, a head driving frequency of 5 kHz, and an ejection volume of 55 pl (pico liter) per dot in environment of 25° C. and 55% RH. The recording conditions were kept the same throughout the Examples and Comparative Examples.

The recorded image was evaluated as below.

(1) Image Density

A solid print image was formed with the liquid composition and the black ink. After being left standing for 12 hours, the reflection density was measured by a reflectometer, McBeth RD915 (manufactured by McBeth Co.). The evaluation standards are as below:

Good: Reflection density being 1.20 or higher

Fair: Reflection density being from 1.10 to 1.19

Poor: Reflection density being 1.09 or lower (2) Fixability

A solid print image was formed with the liquid composition and the black ink. The fixation state was tested by smearing the formed solid print image with a finger. When the image was not smeared, the image was considered to have been fixed. The fixability was evaluated according to the time for the fixation.

Good: Fixed in 20 seconds or a shorter time

Fair: Fixed in 21 seconds to 30 seconds

Poor: Fixed in 31 seconds or a longer time (3) Print Quality

Alphabets and numerals were printed with the liquid composition and the black ink. The printed letters were evaluated by visual observation.

Good: Feathering being not significant

Poor: Feathering being significant (4) Water Resistance

The image formed in the above item (1), after being left standing for 30 minutes, was dipped in tap water at 20° C. for 3 seconds, and the remaining state of the image was evaluated by visual observation.

Good: No flow of the image being observed at all

Poor: Flow of the image being observed

In Examples and Comparative Examples, the deposition area of the liquid composition was the same as the image formation area, the recording duty was 100% both for the liquid composition and for the ink, and printing was conducted in one direction with the liquid composition deposited prior to the ink.

The combinations of the black ink and the liquid composition are shown in Table 3. The evaluation results for items (1) to (4) are also shown in Table 3.

In the above Examples, the black solid prints had high density and excellent color tone.

COMPARATIVE EXAMPLE 1 TO 4

The inks L-1 to L-4 were prepared which had the composition shown in Table 4. The inks were combined with the liquid composition M-1, and the combined mixtures were subjected to a printing test in the same manner as in Example 1, and were evaluated in the same manner as in the Examples. The results are shown in Table 5.

In the Comparative Examples, the formed images had low image density, and the black solid prints were unsatisfactorily tinged with red.

As shown above, the present invention gives, by ink-jet recording, black prints having excellent black color tone with high image density, high printing letter quality, and complete water resistance.

TABLE 1

| | Cationic lower-molecular compound | Cationic higher-molecular compound | Solvent | Water |
| --- | --- | --- | --- | --- |
| M-1 | None | PAA-HCL-3L (3 parts) | DEG (10 parts) | 87 parts |
| M-2 | BTBAC (3 parts) | PAA-HCL-3L (3 parts) | DEG (10 parts) | 84 parts |
| M-3 | G-50 (2 parts) | PAS-A-5 (5 parts) | DEG (10 parts) | 83 parts |
| M-4 | G-50 (2 parts) | Sanflock 700 (5 parts) | DEG (10 parts) | 83 parts |

Abbreviations:
PAA-HCL-3L: Polyallylamine hydrochloride (Molecular weight: 10,000, produced by Nitto Boseki Co., Ltd.)
PAS-A-5: Polyamine sulfone hydrochloride (molecular weight: 3,500, produced by Nitto Baseki Co., Ltd.)
BTBAC: Benzyltributylammonium chloride (produced by Tokyo Kasei K.K.)
G-50: Benzalkonium chloride (Sanyo Chemical Industries, Ltd.)
DEG: Diethylene glycol

TABLE 2

| | Black dye | Added dye | Solvent | Water | Viscosity (cP) | Surface tension (dyn/cm) | pH |
| --- | --- | --- | --- | --- | --- | --- | --- |
| I-1 | FB-2 (3.5 parts) | DBL-199 (0.5 part) | DEG (10 parts) | 86 parts | 1.3 | 60.1 | 9.5 |
| I-2 | FB-2 (3.8 parts) | AB-9 (0.2 part) | DEG (10 parts) | 86 parts | 1.3 | 60.0 | 9.4 |
| I-3 | DBK-168 (3.8 parts) | DY-142 (0.4 parts) | DEG (10 parts) | 86 parts | 1.3 | 60.2 | 9.5 |
| I-4 | DBK-168 (3.8 parts) | AY-23 (0.4 parts) | DEG (10 parts) | 86 parts | 1.3 | 60.0 | 9.4 |
| I-5 | DBK-51 (3.5 parts) | DBL-199 (3.0 parts) DY-86 (0.5 part) | DEG (15 parts) | 76 parts | 1.3 | 60.2 | 9.5 |

Abbreviations:
FB-2: C.I. Food Black 2
DBK-168: C.I. Direct Black 168
DBK-51: C.I. Direct Black 51
DBL-199: C.I. Direct Blue 199
AB-9: C.I. Acid Blue 9
DY-142: C.I. Direct Yellow 142
AY 23: C.I. Acid Yellow 23
DY-86: C.I. Direct Yellow 86

TABLE 3

| Example | Ink | Composition | Image density | Fixability | Print quality | Water resistance |
|---|---|---|---|---|---|---|
| 1 | I-1 | M-1 | Good | Fair | Good | Good |
| 2 | I-1 | M-2 | Good | Good | Good | Good |
| 3 | I-1 | M-3 | Good | Good | Good | Good |
| 4 | I-1 | M-4 | Good | Good | Good | Good |
| 5 | I-2 | M-1 | Good | Fair | Good | Good |
| 6 | I-2 | M-2 | Good | Good | Good | Good |
| 7 | I-2 | M-3 | Good | Good | Good | Good |
| 8 | I-2 | M-4 | Good | Good | Good | Good |
| 9 | I-3 | M-1 | Good | Fair | Good | Good |
| 10 | I-3 | M-2 | Good | Good | Good | Good |
| 11 | I-3 | M-3 | Good | Good | Good | Good |
| 12 | I-3 | M-4 | Good | Good | Good | Good |
| 13 | I-4 | M-1 | Good | Fair | Good | Good |
| 14 | I-4 | M-2 | Good | Good | Good | Good |
| 15 | I-4 | M-3 | Good | Good | Good | Good |
| 16 | I-4 | M-4 | Good | Good | Good | Good |
| 17 | I-5 | M-1 | Good | Fair | Good | Good |
| 18 | I-5 | M-2 | Good | Good | Good | Good |
| 19 | I-5 | M-3 | Good | Good | Good | Good |
| 20 | I-5 | M-4 | Good | Good | Good | Good |

TABLE 4

| Ink | Black dye | Solvent | Water |
|---|---|---|---|
| L-1 | FB-2 (4.0 parts) | DEG (10 parts) | 86 parts |
| L-2 | FB-2 (4.0 parts) | DEG (10 parts) | 86 parts |
| L-3 | DBK-168 (4.0 parts) | DEG (10 parts) | 86 parts |
| L-4 | DBK-51 (4.0 parts) | DEG (10 parts) | 86 parts |

Abbreviations:
FB-2: C.I. Food Black 2
DBK-168: C.I. Direct Black 168
DBK-51: C.I. Direct Black 51
DEG: Diethylene Glycol

TABLE 5

| Comparative Example | Ink | Image density | Fixability | Print quality | Water resistance |
|---|---|---|---|---|---|
| 1 | L-1 | Poor | Fair | Good | Good |
| 2 | L-2 | Poor | Fair | Good | Good |
| 3 | L-3 | Poor | Fair | Good | Good |
| 4 | L-4 | Poor | Fair | Good | Good |

What is claimed is:

1. An ink set comprising a liquid composition containing a lower-molecular cationic substance and a higher-molecular cationic substance and a black ink in combination, the black ink containing a black dye, and a cyan dye, yellow dye or mixtures thereof as water-soluble anionic dyes.

2. An ink set comprising a liquid composition containing a lower-molecular cationic substance of a molecular weight of not higher than 1000 and a higher-molecular weight cationic substance of a molecular weight of not lower than 1,500 and a black ink in combination, the black ink containing a black dye, and a cyan dye, yellow dye or mixtures thereof as water-soluble anionic dyes.

3. The ink set according to claim 1 or 2, wherein the anionic dye is any one of acid dyes, direct dyes, and reactive dyes.

4. The ink set according to claim 1 or 2, wherein the black ink contains the anionic dye at a content of from 0.1 to 15% by weight based on the entire black ink.

5. The ink set according to claim 1 or 2, wherein the black ink contains the cyan dye, yellow dye or mixtures thereof at a content of 0.1 to 50% by weight based on the total weight of the black dye.

6. The ink set according to claim 1 or 2, wherein the black ink contains the cyan dye, yellow dye or mixtures thereof at a content of 0.5 to 40% by weight based on the total weight of the black dye.

7. The ink set according to claim 1 or 2, wherein the lower-molecular cationic substance has a molecular weight ranging from 100 to 700.

8. The ink set according to claim 1 or 2, wherein the higher-molecular cationic substance has a molecular weight ranging from 1,500 to 10,000.

9. The ink set according to claim 1 or 2, wherein the black ink further comprises water and a water-soluble organic solvent.

10. The ink set according to claim 1 or 2, wherein the liquid composition further comprises water and a water-soluble organic solvent.

11. The ink set according to claim 1 or 2, wherein the ink contains water at a content of from 10 to 97.5% by weight based on the total weight of the ink.

12. The ink set according to claim 1 or 2, wherein the ink contains an organic solvent at a content of from 2 to 80% by weight based on the total weight of the ink.

13. The ink set according to claim 1 or 2, wherein the ink has a viscosity ranging from 1 to 20 cP at 25° C.

14. The ink set according to claim 1 or 2, wherein the ink has a surface tension of not lower than 25 dyn/cm at 25° C.

15. The ink set according to claim 1 or 2, wherein the ink has a pH ranging from 6 to 10.

16. The ink set according to claim 1 or 2, wherein any of a yellow ink, a magenta ink, and a cyan ink is combined.

17. An image-forming method employing a liquid composition containing a lower-molecular cationic substance and a higher-molecular cationic substance, and a black ink in combination for forming a black color portion, the black ink containing a black dye, and a cyan dye, yellow dye or mixtures thereof as water soluble anionic dyes.

18. A method for mitigating a bronzing phenomenon in an image formation, employing a liquid composition containing a lower-molecular cationic substance and a higher-molecular cationic substance, and a black ink in combination for forming a black color portion, the black ink containing a black dye, and a cyan dye, yellow dye or mixtures thereof as water soluble anionic dyes.

19. An image-forming method comprising forming a black image portion by applying a liquid composition and a black ink on a recording medium by an ink-jet system, which employs an ink set as stated in claim 1 or 2.

20. The image-forming method according to claim 19 wherein the ink-jet system is a system to eject ink droplets by action of thermal energy applied to the ink.

21. A recording unit comprising containers for a liquid composition and a black ink, and a head for ejecting the liquid composition and the black ink as droplets, the recording unit employing an ink set as stated in claim 1 or 2.

22. The recording unit according to claim 21 wherein an ink-jet system to eject droplets by action of thermal energy is applied to the head.

23. An ink cartridge comprising containers for a liquid composition and a black ink, employing an ink set as stated in claim 1 or 2.

24. An ink-jet recording apparatus, provided with a recording unit as stated in claim 21.

25. An ink-jet recording apparatus, provided with a recording unit as stated in claim 22.

26. An ink-jet recording apparatus, having the ink cartridge as stated in claim 23.

27. The ink-jet recording apparatus according to claim 26 having a recording head which ejects ink droplets by an ink-jet system.

28. An ink-jet recording apparatus, provided with an ink set as stated in claim 1 or 2.

29. The ink-jet recording apparatus according to claim 28, which is further provided with a head which ejects ink droplets by an ink-jet system.

30. An image, comprising a black portion formed by combined use of a liquid composition containing a lower-molecular cationic substance and a higher-molecular cationic substance, and a black ink, the black ink containing a black dye, and a cyan dye, yellow dye or mixtures thereof as water-soluble anionic dyes in combination.

31. An image-forming method employing a liquid composition containing a lower-molecular cationic substance of not higher than 1,000 and a higher-molecular cationic substance of not lower than 1,500 and a black ink in combination for forming a black color portion, the black ink containing a black dye, and a cyan dye, yellow dye or mixtures thereof as water-soluble anionic dyes.

32. A method for mitigating a bronzing phenomenon in an image formation, employing a liquid composition containing a lower-molecular cationic substance of not higher than 1,000 and a higher-molecular cationic substance of not lower than 1,500 and a black ink in combination for forming a black color portion, the black ink containing a black dye, and a cyan dye, yellow dye or mixtures thereof as water-soluble anionic dyes.

33. An image, comprising a black portion formed by combined use of a liquid composition containing a lower-molecular cationic substance of not higher than 1,000 and a higher-molecular cationic substance of not lower than 1,500 and a black ink in combination for forming a black color portion, the black ink containing a black dye, and a cyan dye, yellow dye or mixtures thereof as water-soluble anionic dyes.

\* \* \* \* \*

UNITED STATES PATENT AND TRADEMARK OFFICE
CERTIFICATE OF CORRECTION

PATENT NO. : 5,614,007
DATED : March 25, 1997
INVENTOR(S) : YUTAKA KURABAYASHI, ET AL.

It is certified that error appears in the above-identified patent and that said Letters Patent is hereby corrected as shown below:

COLUMN 2:

Line 35, "s" should read --a--.

COLUMN 3:

Line 50, "one of the" should read --weight--.
Line 51, "substances" should read --substance--.

COLUMN 4:

Line 49, "lauryldihydroxyethyl-betaine," should read --lauryldihydroxyethylbetaine,--.

COLUMN 5:

Line 32, "feature" should read --feature that--.

UNITED STATES PATENT AND TRADEMARK OFFICE
CERTIFICATE OF CORRECTION

PATENT NO. : 5,614,007
DATED : March 25, 1997
INVENTOR(S) : YUTAKA KURABAYASHI, ET AL.

It is certified that error appears in the above-indentified patent and that said Letters Patent is hereby corrected as shown below:

COLUMN 9:

Line 15, "a" should read --the--.
    Line 16, "the" should read -- a--.

COLUMN 12:

Line 17, "position" should read --positions--.

COLUMN 14:

Line 49, "claim 19" should read --claim 19,--.
    Line 56, "claim 21" should read --claim 21,--.

COLUMN 15:

Line 1, "claim 26" should read --claim 26,--.

COLUMN 16:

Line 1, "an" should be deleted.

Signed and Sealed this

Fourteenth Day of October, 1997

Attest:

BRUCE LEHMAN

Attesting Officer      Commissioner of Patents and Trademarks